US007197598B2

(12) United States Patent
Kim et al.

(10) Patent No.: US 7,197,598 B2
(45) Date of Patent: Mar. 27, 2007

(54) APPARATUS AND METHOD FOR FILE LEVEL STRIPING

(75) Inventors: Chang-Soo Kim, Daejeon (KR); Yuhyeon Bak, Daejeon (KR); Young Ho Kim, Daejeon (KR); Dong Jae Kang, Daejeon (KR); Hag Young Kim, Daejeon (KR); Myung-Joon Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 577 days.

(21) Appl. No.: 10/621,461

(22) Filed: Jul. 18, 2003

(65) Prior Publication Data

US 2004/0107314 A1 Jun. 3, 2004

(30) Foreign Application Priority Data

Nov. 29, 2002 (KR) ...................... 10-2002-0075192

(51) Int. Cl.
*G06F 12/00* (2006.01)
(52) U.S. Cl. .................................... 711/114
(58) Field of Classification Search ...................... None
See application file for complete search history.

(56) References Cited

U.S. PATENT DOCUMENTS 5,828,876 A    10/1998  Fish et al.
6,064,635 A *   5/2000  Machiguchi ............. 369/30.31
6,195,650 B1 *  2/2001  Gaither et al. ................. 707/1
6,233,654 B1 *  5/2001  Aoki et al. ................. 711/114
6,377,500 B1 *  4/2002  Fujimoto et al. ...... 365/230.01
6,678,788 B1 *  1/2004  O'Connell ................. 711/114
6,742,137 B1 *  5/2004  Frey, Jr. ........................ 714/6

FOREIGN PATENT DOCUMENTS

KR     1999-53164    7/1999

OTHER PUBLICATIONS

Suresh, et al.; "*A Persistent Snapshot Device Driver for Linux*"; 2001 Annual Linux Showcase/ Usenix, Nov. 5-10, 2001; pp. 173-182.

* cited by examiner

*Primary Examiner*—Kevin L. Ellis
*Assistant Examiner*—Duc T. Doan
(74) *Attorney, Agent, or Firm*—Lowe Hauptman & Berner, LLP

(57) ABSTRACT

A file level striping method adds an option for indicating whether or not to support file level striping to a file creation interface in a file system, extends an inode structure to include a last disk ID field, initializes the last disk ID when the file is created in the file system, allocates a physical block based on the last disk ID when the physical block allocation is requested at the time of file I/O request in the file system, and modifies the last disk ID value to reflect the physical block allocation made by a volume manager. An apparatus using the file level striping method includes a number of disks for storing information actually, the volume manager for logically grouping a number of disks and a file system for creating files on said logical volume and performing I/O operations.

7 Claims, 8 Drawing Sheets

APPARATUS AND METHOD FOR FILE LEVEL STRIPING

FIELD OF THE INVENTION

The present invention relates to file level striping; and, more particularly to an apparatus and method for storing file data distributed across two or more disks.

BACKGROUND OF THE INVENTION

As multimedia-based services are prevailing in the present computer environment owing to the progress of internet, the conventional file size for the service has become large.

Namely, high-speed data input/output (I/O) operations are essentially required to support a high-speed service for a large amount of data. A striping scheme is used at the system employing volume manager technique or RAID (Redundant Array of Inexpensive Disks) technique in order to provide a high-speed service.

In the striping scheme mentioned above, data is distributed across more than two disks and I/O operation is performed in a parallel manner for a better performance.

Also, in the file system area, since a file system may be located on a single disk (for example, when a volume manager or a RAID system is used, two or more disks are recognized as a single logical device to be recognized as a single device) and the data of each file may be scattered on the single disk, the size of a block, a fundamental unit in I/O operations, has been set large, focusing on how to locate data segments adjacent to one another, for an improved performance.

However, data is distributed according to a logical address in the striping scheme employing volume manager technique or RAID system technique, as illustrated in FIG. 1, which shows a striping scheme of a conventional volume manager.

Namely, the respective logical address blocks correspond sequentially to the respective blocks of the disk drives, for example, block-0 100, the first logical address block, to the first block 120 of disk-0 and the second block in the logical addresses to the first block of disk-1. In addition, several continuous blocks may be incorporated to a concept of an extent to enhance the I/O performance of a large capacity file.

FIG. 2 shows a conventional inode structure and a file data distribution on disks, wherein the inode structure comprises a header area 210 for storing file information and pointers 220 for a number of data blocks which store the file data.

Namely, with reference to FIG. 2, continuous logical blocks are not allocated to store the data of each file. The data of each file are dispersed across the whole logical volume. As a result, data can be maldistributed into a certain disk rather than being distributed evenly across the whole disks, which deteriorates file I/O performance.

Next, adjacent allocation of data blocks, which is introduced for effective I/O operation of high capacity files, e.g., multimedia files, in a file system, brings forth the same effect as the case of extents, instead of blocks, being used.

A prior art to the file level striping scheme is described in Korean Patent No. 10-1997-0072755 entitled to "Fast system reconstruction method in RAID level 5 system" registered on Dec. 23, 1997, U.S. Pat. No. 5,828,876 entitled to "File system for clustered processing system" registered on Oct. 27, 1998 and "A Persistent Snapshot Device Driver for Linux", carried in 2001 Annual Linux Showcase/Usenix published on Nov. 6 to 10, 2001.

According to the above first prior art, data and parity blocks distributed across the whole disks are newly arranged to implement fast system reconfiguration in RAID level 5 system. According to the conventional method, the contents of the whole disks are read and then rewritten to the disks with a batch scheme, with the system operation intermitted.

Accordingly, the reconfiguration procedure caused a big overhead to the system performance due to the cost for the memory, which store the content of the related disk temporarily, and the time for performing a number of read/write operations.

Next, a file system for a clustered processing system is an effective file system that stores and retrieves data in a unix cluster computer system which includes a connection network for connecting processing nodes.

Namely, the improved file system is a data storing device, for example a disk device, connected to each processing node with a form of a shared SCSI device. The whole structure of the file system includes all the information needed for each processing unit to access the storing device.

The file system is divided into a super block area for managing the file system, an inode bitmap area, a revised journal area, an inode area, a data block bitmap area, and a data block area. The file system uses an interface with a distribution lock manager for controlling the use of the system.

Next, "A Persistent Snapshot Device Driver for Linux" provides online backup providing a persistent availability of data requested by a web server or a large capacity enterprise system. Moreover, the downtime of a system for performing the conventional offline backup can be prevented.

According to the paper, the snapshot technique, which supports online backup, provides a Linux-based device driver providing a permanent snapshot in a cluster circumstance; records metadata such as mapping blocks or modification blocks in a log disk; introduces a transaction identifier to overcome a system error in reflecting the log to the disk; and provides a lock manager for serializing the accesses to the metadata such as mapping information.

Even with the technologies of the prior patents, data for a specific file can still be maldistributed into a specific disk resulting in inefficiency in I/O operation.

SUMMARY OF THE INVENTION

It is, therefore, an object of the present invention to provide a file level striping apparatus and method for distributing each file data evenly across two or more disks.

In accordance with a preferred embodiment of the present invention, there is provided a file level striping apparatus including: a number of disks, accessed with physical block numbers, for storing information actually; a volume manager for logically grouping a number of disks to form a single large logical volume, wherein the volume manager records the information for managing the logical volume to the participating disks and manages it; and a file system, which recognizes the logical volume as a single storage device, for generating files on a logical volume and performing I/O operations for the generated files with logical block numbers which are applied to the logical volume.

In accordance with another preferred embodiment of the present invention, there is provided a file level striping method employing a file system and a volume manager, the method including the steps of: adding an option for indicating whether or not to support file level striping to the file creation interface; extending an inode structure to include a last disk ID field; initializing the last disk ID when a file is created in the file system; allocating a physical block based on the last disk ID when a physical block allocation is required at the time of file I/O request in the file system; and modifying the last disk ID value to reflect the physical block allocation made by the volume manager.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
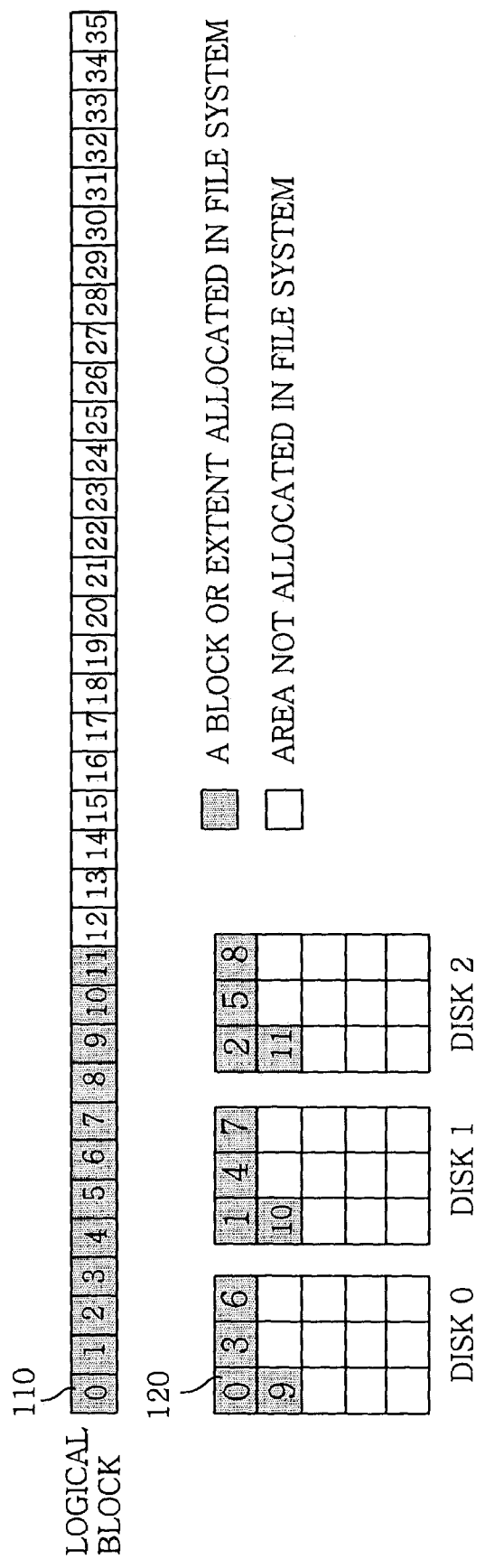
FIG. 1 shows striping scheme of the conventional volume manager.
Figure 2:
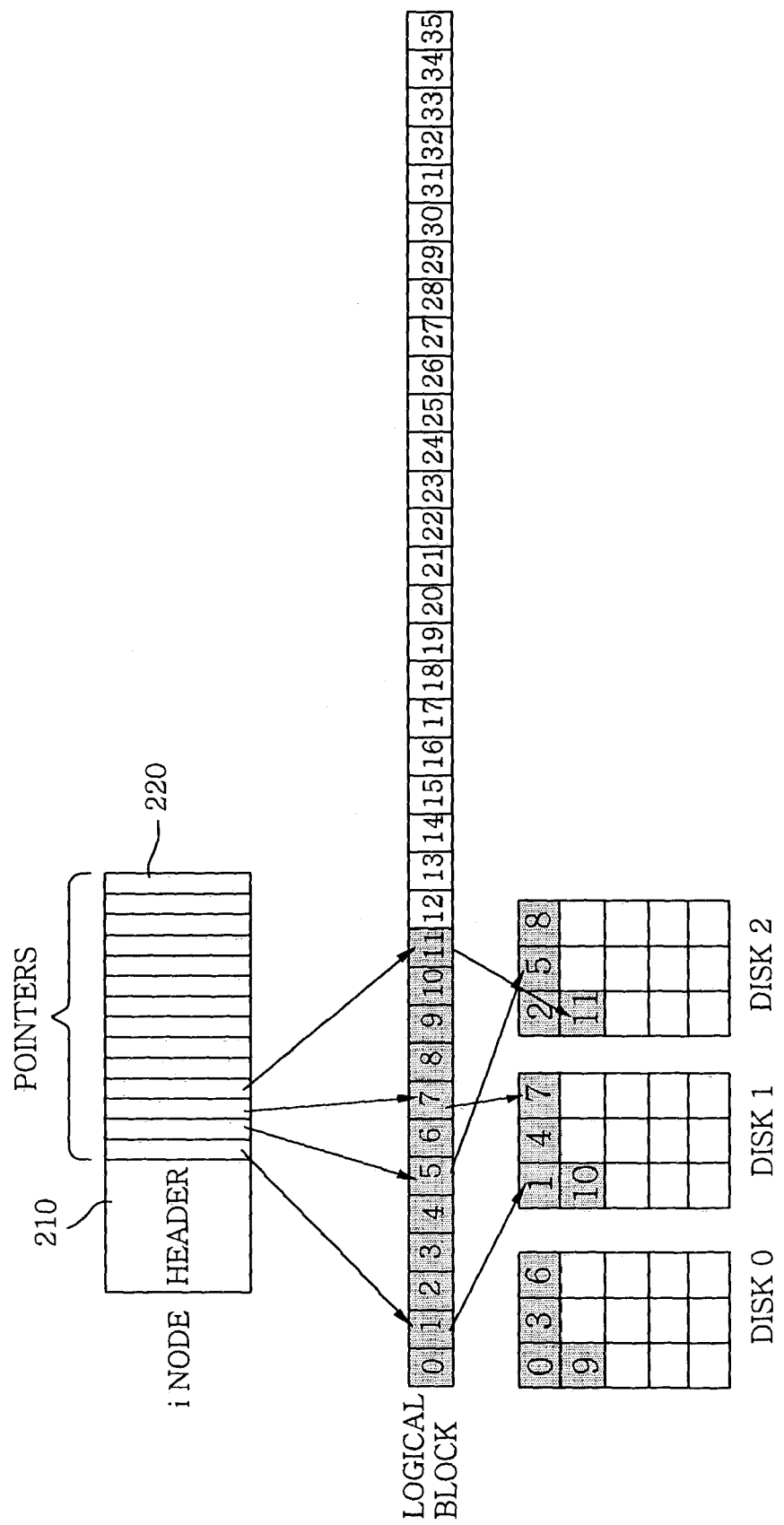
FIG. 2 describes the conventional inode structure and disk distribution of file data.
Figure 3:
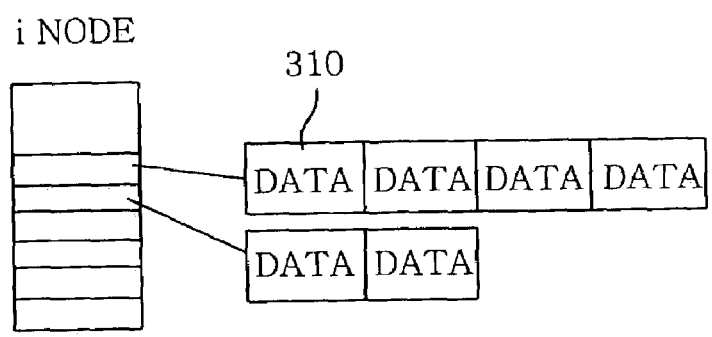
FIG. 3 illustrates the conventional adjacent allocation of file data.
Figure 4:
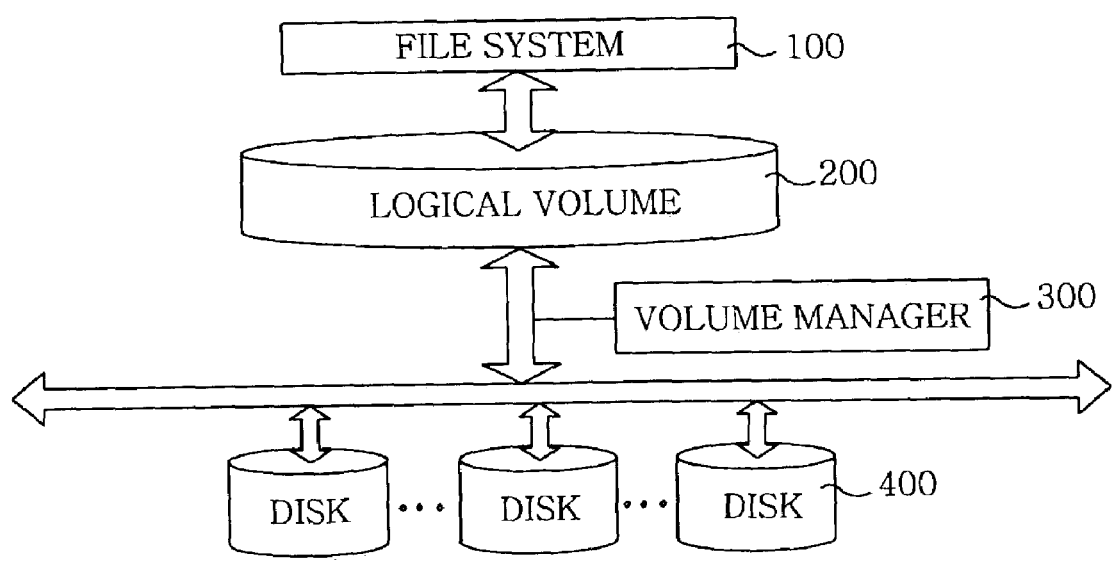
FIG. 4 shows a file level striping apparatus according to the present invention.

FIG. 4 is a diagram of a file level striping apparatus comprising a file system 100, a logical volume 200, a volume manager 300 and a number of disks 400.

The file system 100 recognizes the logical volume 200 provided by the volume manager 300 as a single storage device. The file system 100 creates files on the logical volume, and applies a logical block number on the logical volume 200 in order to performing input/output operations to the created file.

The logical volume 200 is provided in such a way that a number of disks 400 are grouped logically to be recognized as a single virtual storage device, and is accessed by the logical block numbers.

The volume manager 300 is a module in a conventional computer system or a RAID system, which groups logically a number of disks to form a single large logical volume, records information required for managing the logical volume 200 to the disks 400 and manages the information.

The disks 400 are accessed with physical block numbers. They store information actually.

Figure 5:
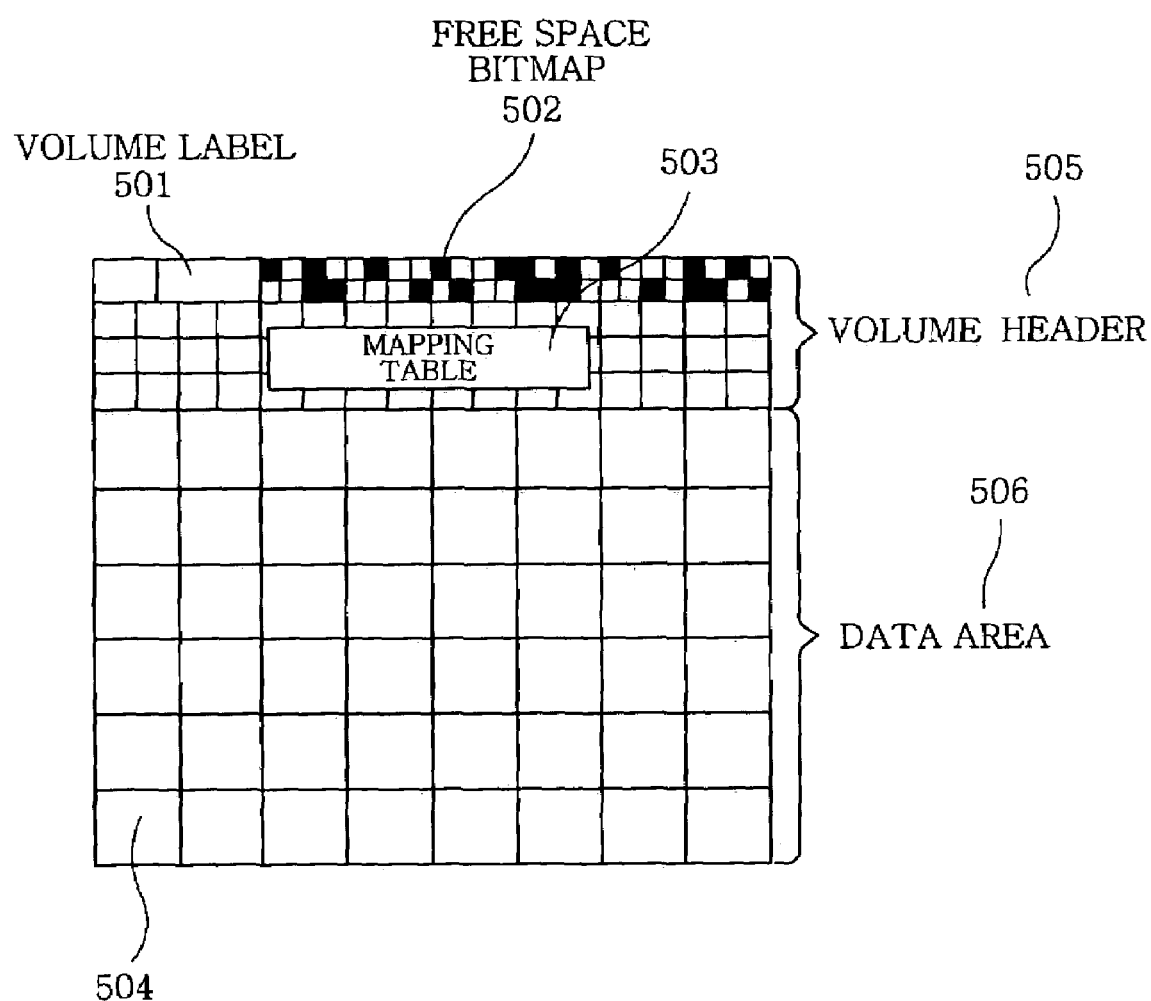
FIG. 5 shows the internal structure of disks managed by the volume manager of the present invention.

FIG. 5 is a diagram showing the internal structure of a disk managed by the volume manager 300. More specifically, FIG. 5 is an enlarged diagram of a certain disk 400 illustrated in FIG. 4.

Namely, the volume manager 300 generates a volume label area 501 for storing information needed for managing the logical volume 200 in a disk 400.

Then, a free space bitmap 502 for controlling physical block allocation of disks 400 is designated and managed. A mapping table 503 is also designated and managed to store the correspondence relationship between physical blocks 504 and logical blocks.

The remaining space of the disk 400, except for the volume header 505 including the volume label 501, the free space bitmap 502, the mapping table, is managed as a data area 506 of physical blocks for storing file data.

The structure extension method according to the present invention comprises adding an option for indicating whether or not to support file level striping to the file creation interface in the file system; and extending an inode structure to include a last disk ID field 601 for storing information about the ID of the disk in which the last physical block allocation occurred.

Figure 6:
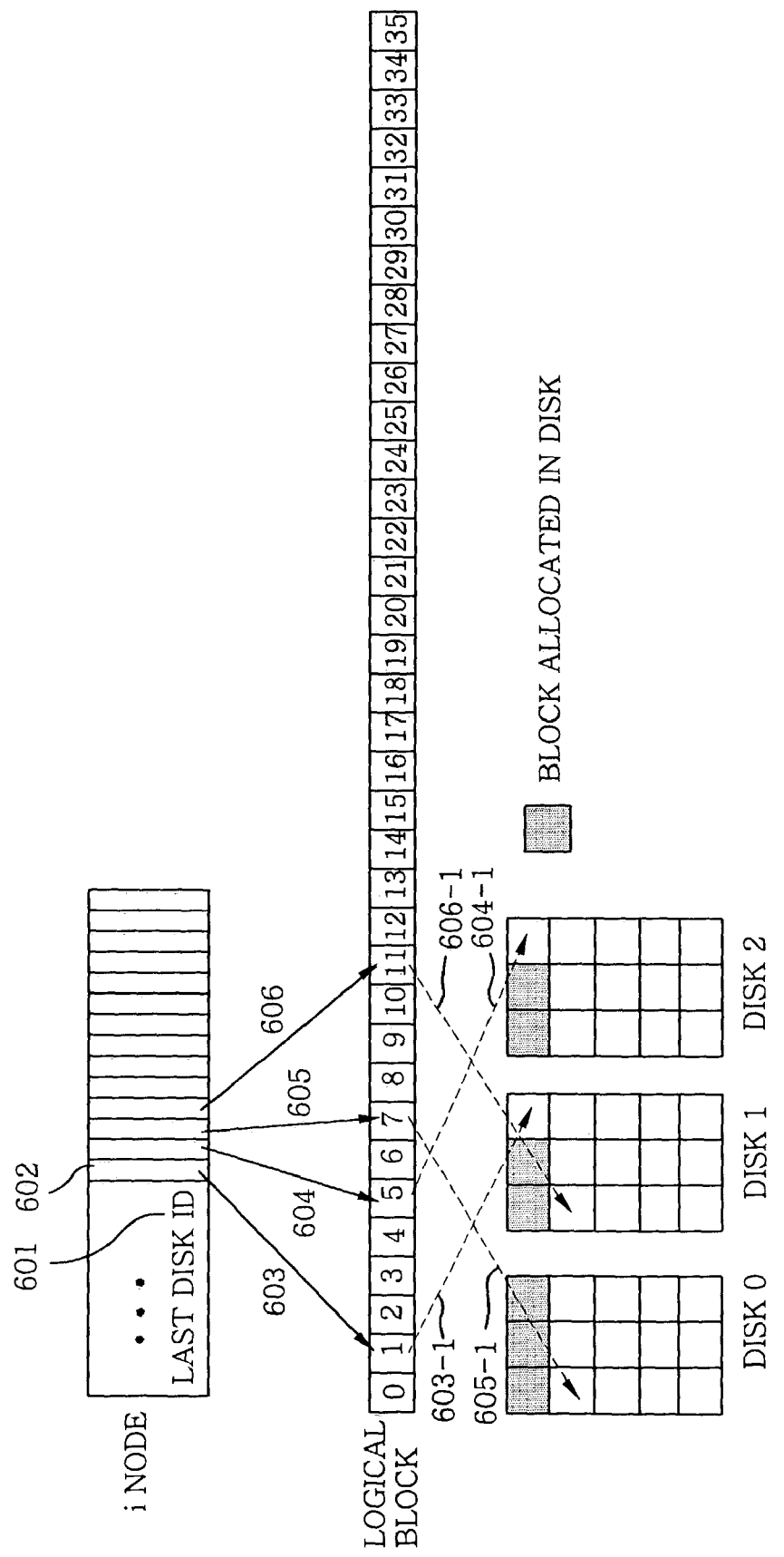
FIG. 6 illustrates the inode structure and block allocation for a specific file according to the present invention.
Figure 7:
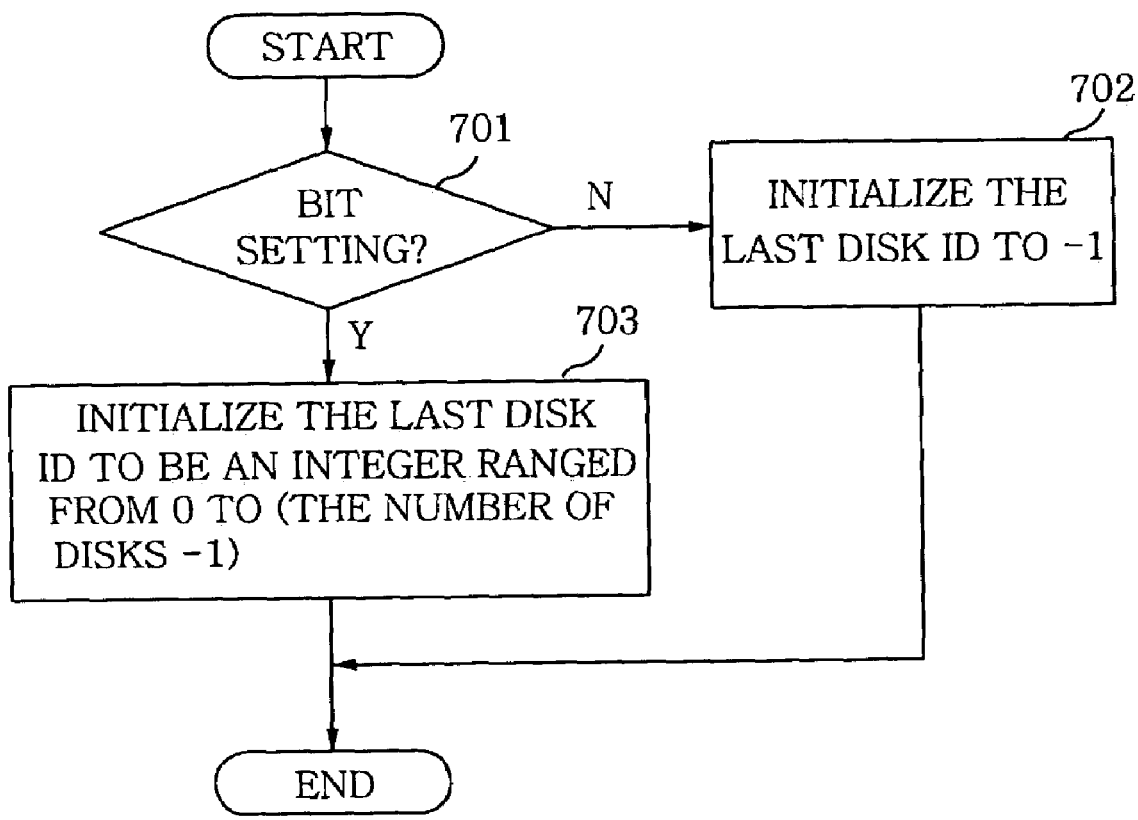
FIG. 7 describes the step of initializing the last Disk ID value.

The flowchart of FIG. 7 gives a full detail of the procedure that the last disk ID 601 in the extended inode structure of FIG. 6 is initialized when a file is generated in the file system 100.

Namely, the file system 100 of FIG. 4 determines whether a bit for designating file level striping is set in the mode given as an option in the file creation interface (step 701).

If the bit is not set, it means that the file does not support a file level striping, and the value of the last disk ID 601 is initialized to be −1 (step 702).

However, if the bit is set in the determining step (701), it means that the file supports the file level striping, and the value of the last disk ID 601 is initialized to be a random integer value from 0 to the number of disks participating in the logical volume −1 (step 703), wherein a random integer is to get rid of the possibility that concentrated allocation of many data blocks are performed to the disk corresponding to the value.

Figure 8:
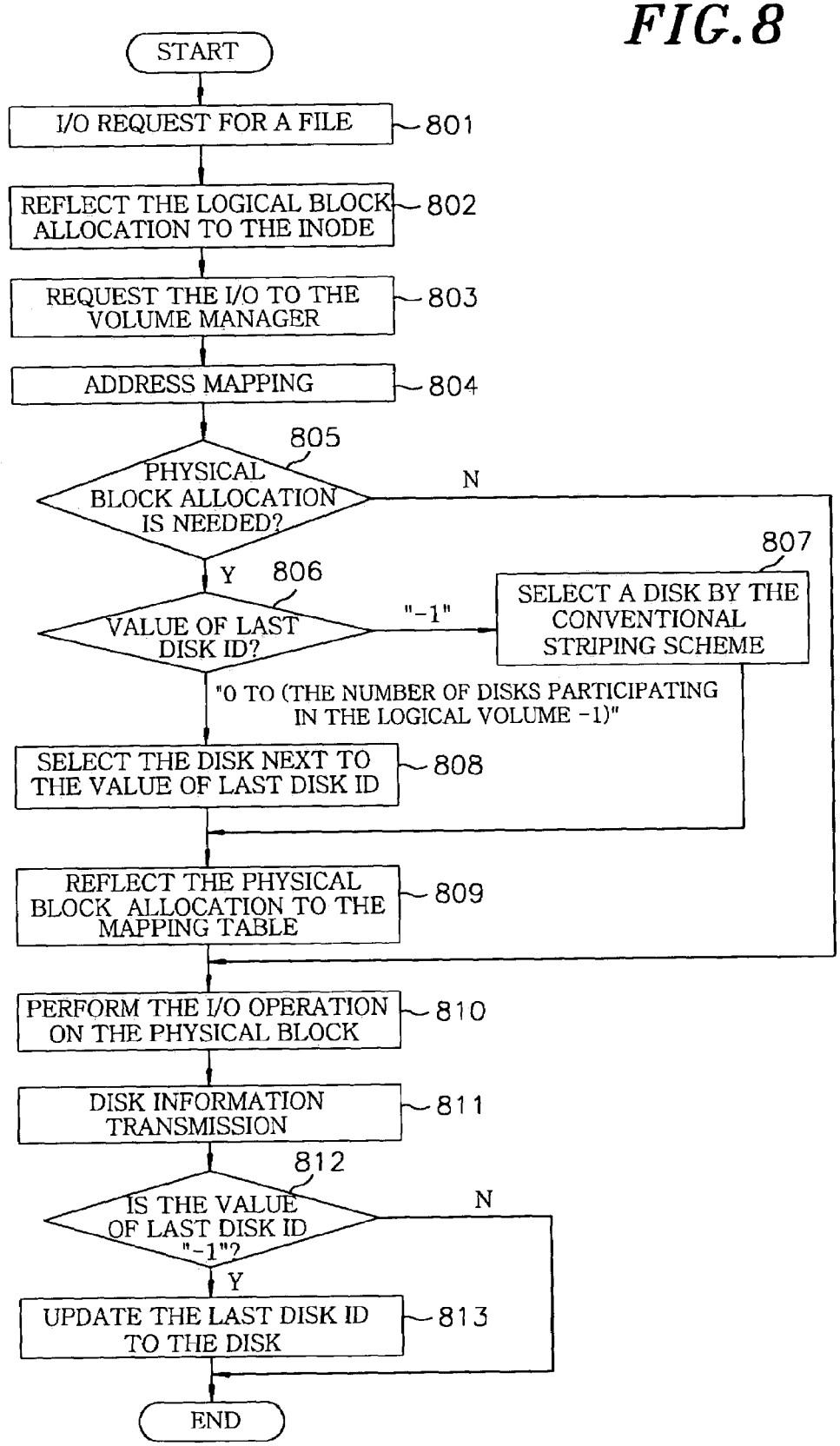
FIG. 8 describes the step of physical block allocation of the volume manager and the step of modifying the last Disk ID value at the file system according to the present invention.

FIG. 8. describes the procedure according to the file level striping scheme of the present invention in detail, wherein an input/output of the file is proceeded after a file is created by a file system 100 and the last disk ID 601 is initialized, with reference to FIG. 6.

A file system user requests an input/output of a file providing file offset information on the above mentioned file (step 801).

When a file I/O operation is requested, the file system inspects the logical block pointer 602 corresponding to the file offset, in the inode for the file and determines the corresponding logical block. If the logical block pointer has the null value, it means that any logical block is not allocated to the file offset. Therefore the file system allocates one of the unused logical blocks to the file offset and the result is recorded in the logical block pointer of the inode (step 802).

After the above logical block determining step is completed, the file system requests the file I/O operation to the determined logical block to the volume manager, which is a lower level input/output system (step 803).

Next, the volume manager 300 performs an address mapping operation to determine the disk and the physical block corresponding to the logical block (step 804).

It is checked whether physical block allocation is not needed since the disk and the physical block corresponding to the logical block are determined as a result of the address mapping operation or physical block allocation is needed since the logical block is used for the first time. (step 805).

If physical block allocation turns out needless at the checking step 805, input/output operations are performed on the determined disk and physical block (step 810).

On the other hand, if physical block allocation is required at the checking step 805, the volume manager checks the value of the last disk ID 601 of the inode corresponding to the file (step 806).

If the value of the last disk ID 601 turns out −1 at the checking step 806, meaning that file level striping is not performed for the file, the disk in which physical block allocation to be performed is selected among the entire volume referring a variable for determining the disk in which the next physical block allocation to be performed, just as in the conventional striping scheme (step 807).

On the other hand, if the value of the last disk ID 601 turns out to be in the range from 0 to the number of the disks associated with the logical volume minus 1 at the checking step 806, meaning that file level striping is supported, the disk of the number next to the last disk ID 601 value is selected for the physical block allocation (step 808).

When a disk, in which physical block allocation to be performed, is determined, the volume manager 300 executes physical block allocation referring to the free space bitmap 502 of the determined disk and updates the mapping table 503 with the allocation result (step 809).

After determining the disk and the physical block with the steps 805, 806, 807, 808, 809 lying after the address mapping step 804, the volume manager performs the I/O operation on the physical block (step 810).

When the I/O operation on the physical block is completed, the volume manager 300 transmits the information whether and in which disk, if any, physical block allocation has been done to the file system 100 (step 811). The file system 100 inspects whether physical block allocation has been done and whether the value of the last disk ID 601 is not −1 (step 812).

If it turns out that physical block allocation took place and the value of the last disk ID 601 is not −1 in the inspecting step 812, the file system 100 replaces the value of the last disk ID 601 in the inode for the file with the value of the ID of the disk to which physical block was allocated according to the information transmitted by the volume manager, and the file I/O operation is completed (step 813).

Figure 9:
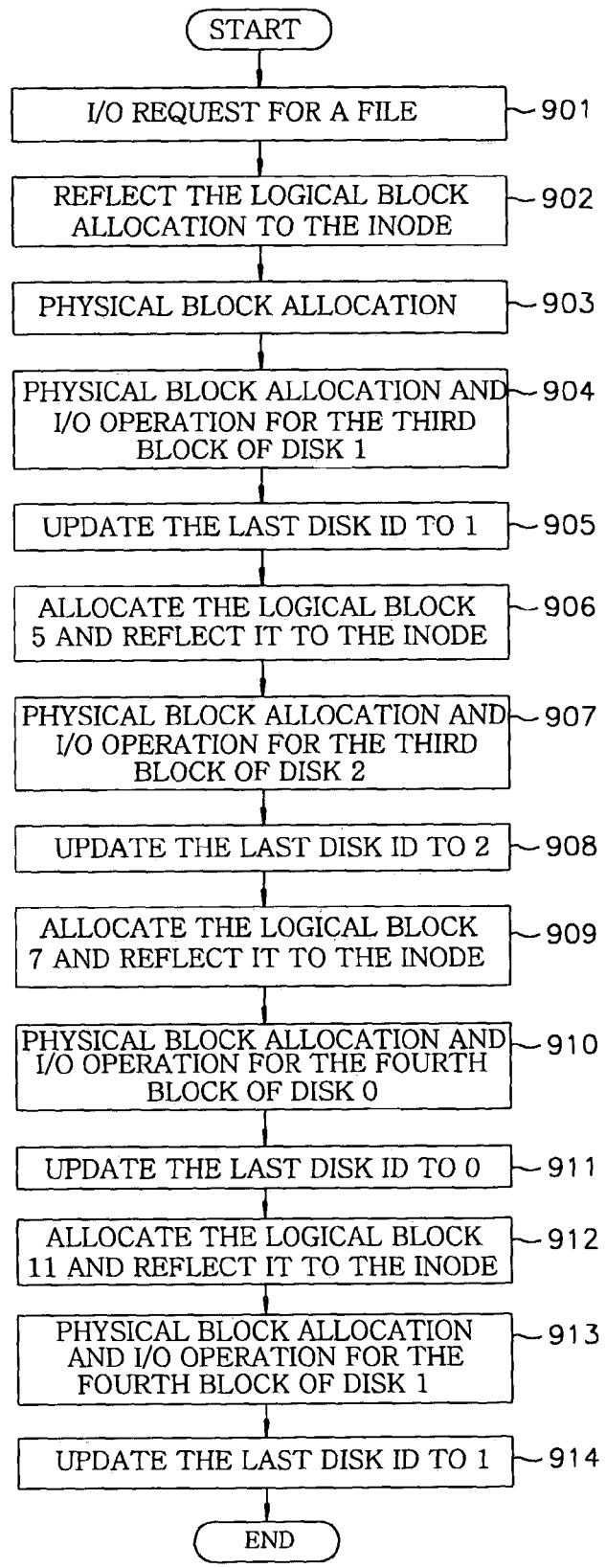
FIG. 9 describes the I/O procedure according to the illustration of FIG. 6.

FIG. 9 is a flow chart according to an embodiment illustrated in FIG. 6, describing a file level striping scheme according to an embodiment of the present invention.

At first, when a file is created by the file system 100, it is determined according to a given option whether or not to support file level striping. It is assumed that file level striping is supported.

Namely, the value of the last disk ID 601 in the inode for the file is determined to be disk-0, disk-1 or disk-2 since there are only 3 disks as illustrated in FIG. 6. The initial value of the last disk ID 601 is assumed set to zero in the embodiment of the present invention.

Next, when an I/O operation for the file is requested (step 901), the file system 100 allocates the logical block 1 and updates the inode with the allocated value (step 902) Next, when the I/O operation for the logical block 1 is requested to the volume manager 300, a physical block is allocated based on the value of the last disk ID 601 since the logical block 1 is being used for the first time (step 903). In this embodiment, since the value of the last disk ID 601 is zero, physical block allocation is executed in disk-1, with the third block of disk-1 being allocated (603-1).

The allocation result is recorded at the mapping table by the volume manager 300 and the I/O operation for the third block of disk-1 is performed (step 904).

After the I/O operation is completed, the volume manager notifies the file system of the need for modification of the last disk ID 601 and file system 100 changes the value of the last disk ID 601 into 1 (step 905).

Next, when a request for a new I/O operation takes place after the region of the logical block 1 is used completely, a new logical block 5 is allocated, which result is recorded in the inode (step 906).

The I/O request for the logical block 5 requires a new physical block allocation. As the value of the last disk ID is one, the volume manager 300 executes physical block allocation and the I/O operation on the third block of disk2 (step 907).

After the I/O operation is completed, the volume manager 300 notifies the file system of the need for modification of the last disk ID 601, and the file system 100 replaces the value of the last disk ID 601 with two (step 908).

Next, after the whole region of the logical block 5 is used, allocation of a new logical block 7 is made if a file I/O is requested, with which result the inode is updated (step 909).

The I/O request for the logical block 7 requires a new physical block allocation. As the value of the last disk ID is two, the volume manager 300 executes physical block allocation and the I/O operation on the third block of disk2 (step 910).

After the I/O operation is completed, the volume manager 300 notifies the file system of the need for modification of the last disk ID 601, and the file system 100 replaces the value of the last disk ID 601 with zero (step 911).

Next, after the whole region of the logical block 7 is used, allocation of a new logical block 7 is made if a file I/O operation is requested, with which result the inode is updated (step 912).

While the invention has been shown and described with respect to the preferred embodiments, it will be understood by those skilled in the art that various changes and modifications may be made without departing from the spirit and scope of the invention as defined in the following claims.

What is claimed is:

1. A file level striping method employing a file system and a volume manager, the method comprising the steps of:
   adding an option for indicating whether or not to support file level striping to the file creation interface in the file system;
   extending an inode structure to include a last disk ID field for identifying the last disk in which a physical block allocation was made;
   initializing the last disk ID when a file is created in the file system;
   allocating a physical block based on the last disk ID when a physical block allocation is required at the time of file I/O request in the file system; and
   modifying the last disk ID value to reflect the disk in which the physical block allocation was made by the volume manager.

2. The file level striping method of claim 1, said step of initializing the last disk ID comprising further the steps of:
   determining whether the bit for designating file level striping is set in a mode given as an option when a file is created in the file system;
   selecting a random integer in the range of the number of disks participating in the logical volume to set the last disk ID value; and
   setting the last disk ID value to −1 if said bit is not set meaning that the file does not support the file level striping.

3. The file level striping method of claim 2, wherein the random integer is selected to prevent the data block allocation being concentrated to a disk corresponding to the initial value the last disk ID when the initial values of the last disk ID of all the files supporting the file level striping are set constant at a specific value.

4. The file level striping method of claim 1, wherein said option is formed by adding a bit to the mode which is given as an option of the file creation interface.

5. The file level striping method of claim 4, wherein said step of allocation a physical block and said step of modifying the last disk ID value further comprising the steps of:
   requesting a file I/O operation;
   determining which logical block corresponds to the requested file 1/0 operation;
   requesting the volume manager or a lower level I/O system to perform said determined logical block I/O operation;
   performing an address mapping process in order to determine which disk and which physical block therein correspond to said logical block;
   performing I/O operation for the physical block determined to correspond to said logical block at the address mapping process;
   checking the value of the last disk ID of the mode corresponding to the file if physical block allocation turns out to be required since the logical block is used for the first time at the address mapping process;
   selecting the disk of a number next to the value of last disk ID if the value of the last disk ID turns out to be in the range from 0 to the number of the disks associated with the logical volume minus 1;
   performing physical block allocation referring to the free space bitmap of said selected disk;
   updating the mapping table with the allocation result and performing I/O operation for the file on the physical block;
   changing the value of the last disk ID if I/O operation on the physical block is completed; and
   performing I/O operations repeatedly on the physical block for the physical block allocation to be distributed uniformly across the whole disks.

6. The file level striping method of claim 5, wherein said method further comprising the step of selecting a disk in which block allocation to be performed referring to a variable for determining the disk in which the next physical block allocation to be performed if the value of the last disk ID turns out −1 at said checking step.

7. The file level striping method of claim 5, wherein said method further comprising the step of setting the last disk ID value to be the ID of the disk in which block allocation is made only if physical block allocation is done and the last disk ID value for the file is not−1.

* * * * *

UNITED STATES PATENT AND TRADEMARK OFFICE
CERTIFICATE OF CORRECTION

PATENT NO. : 7,197,598 B2  Page 1 of 1
APPLICATION NO. : 10/621461
DATED : March 27, 2007
INVENTOR(S) : Chang-Soo Kim et al.

It is certified that error appears in the above-identified patent and that said Letters Patent is hereby corrected as shown below:

Col. 7, Line 7
5. The file level striping method of claim [[4]] 1, wherein said step of allocation a physical block and said step of modifying the last disk ID value further comprising the steps of: requesting a file I/O operation;
determining which logical block corresponds to the requested file 1/0 operation; requesting the volume manager or a lower level I/O system to perform said determined logical block I/O operation;
performing an address mapping process in order to determine which disk and which physical block therein correspond to said logical block;
performing I/O operation for the physical block determined to correspond to said logical block at the address mapping process;
checking the value of the last disk ID of the mode corresponding to the file if physical block allocation turns out to be required since the logical block is used for the first time at the address mapping process;
selecting the disk of a number next to the value of last disk ID if the value of the last disk ID turns out to be in the range from 0 to the number of the disks associated with the logical volume minus 1;
performing physical block allocation referring to the free space bitmap of said selected disk;
updating the mapping table with the allocation result and performing I/O operation for the file on the physical block;
changing the value of the last disk ID if I/O operation on the physical block is completed; and
performing I/O operations repeatedly on the physical block for the physical block allocation to be distributed uniformly across the whole disks.

Signed and Sealed this

Twenty-fifth Day of December, 2007

JON W. DUDAS
*Director of the United States Patent and Trademark Office*